(12) United States Patent
Harasaki

(10) Patent No.: US 9,298,185 B2
(45) Date of Patent: Mar. 29, 2016

(54) TRAVELING VEHICLE SYSTEM

(75) Inventor: Kazumi Harasaki, Aichi (JP)

(73) Assignee: Murata Machinery, Ltd., Kyoto (JP)

( * ) Notice: Subject to any disclaimer, the term of this patent is extended or adjusted under 35 U.S.C. 154(b) by 369 days.

(21) Appl. No.: 13/122,550

(22) PCT Filed: Jul. 24, 2009

(86) PCT No.: PCT/JP2009/003501
§ 371 (c)(1),
(2), (4) Date: Apr. 4, 2011

(87) PCT Pub. No.: WO2010/041364
PCT Pub. Date: Apr. 15, 2010

(65) Prior Publication Data
US 2011/0184634 A1    Jul. 28, 2011

(30) Foreign Application Priority Data

Oct. 7, 2008   (JP) .................. 2008-261080

(51) Int. Cl.
*G05D 1/02*        (2006.01)
*G05B 19/418*   (2006.01)

(52) U.S. Cl.
CPC ........ *G05D 1/0214* (2013.01); *G05B 19/41895* (2013.01); *Y02P 90/285* (2015.11)

(58) Field of Classification Search
CPC ......... G08G 1/01; G08G 1/00; G08G 1/0116; G08G 1/012; G08G 1/0125; G08G 1/0129; G08G 1/0133; G08G 1/0137; G08G 1/0141; G08G 1/0145; G08G 1/02; G08G 1/048; G08G 1/065; G08G 1/07; G08G 1/093; G08G 1/091; G08G 1/096; G08G 1/096877; G08G 1/0969; G08G 1/123; G08G 1/127; G08G 1/13; G08G 1/137; G08G 1/14; G08G 1/142; G08G 1/143; G08G 1/144; G08G 1/145; G08G 1/146; G08G 1/147; G08G 1/148; G08G 1/149; B61L 1/00; B61L 1/12; B61L 1/14; B61L 1/169; B61L 1/18; B61L 1/181; B61L 1/182; B61L 1/183; B61L 1/184; B61L 1/20; B61L 5/00; B61L 5/08; B61L 3/006; B61L 3/127; B61L 3/128; B61L 3/14; B61L 3/16; B61L 13/002; B61L 13/04; B61L 13/042; B61L 13/045; B61L 13/047; B61L 21/00; B61L 21/02; B61L 21/04; B61L 21/06; B61L 21/065; B61L 21/08; B61L 21/10; B61L 23/00; B61L 23/002; B61L 23/007; B61L 23/02; B61L 23/005; B61L 23/04; B61L 23/041; B61L 23/042; B61L 23/044; B61L 23/047; B61L 23/048; B61L 23/06; B61L 23/08; B61L 23/10; B61L 23/12; B61L 23/14; B61L 23/16; B61L 23/18; B61L 23/20; B61L 23/22; B61L 23/24; B61L 23/26; B61L 23/28; B61L 23/30; B61L 23/34; B61L 23/03; B61L 27/0027; B61L 27/0016; B61L 27/0011; B61L 27/0038; B61L 27/0077; B61L 15/0027; B61L 15/00; B61L 15/0036; B61L 2205/04; B61L 2205/02; B61L 29/24
USPC ............ 701/29.2, 29.4, 117, 118, 119, 123, 701/29.7, 122, 410, 413, 420, 422, 423
See application file for complete search history.

(56) References Cited

U.S. PATENT DOCUMENTS

| | | | | |
|---|---|---|---|---|
| 2,960,735 | A * | 11/1960 | Whitesell ...................... | 164/168 |
| 4,224,979 | A * | 9/1980 | Rosin et al. .................. | 164/130 |
| 4,301,506 | A * | 11/1981 | Turco ............................ | 701/117 |
| 4,309,758 | A * | 1/1982 | Halsall et al. ................. | 701/23 |
| 4,329,632 | A * | 5/1982 | Yoshida et al. ............... | 318/587 |
| 4,344,498 | A * | 8/1982 | Lindfors ....................... | 180/168 |
| 4,361,300 | A * | 11/1982 | Rush .............................. | 246/5 |
| 4,459,668 | A * | 7/1984 | Inoue et al. ................... | 701/20 |
| 5,202,832 | A * | 4/1993 | Lisy ............................... | 701/24 |
| 6,246,956 | B1 | 6/2001 | Miyoshi et al. | |

FOREIGN PATENT DOCUMENTS

| | | |
|---|---|---|
| CN | 1179217 | 4/1998 |
| CN | 1191334 | 8/1998 |
| CN | 1273926 | 11/2000 |
| CN | 1429726 | 7/2003 |
| CN | 1587010 | 3/2005 |
| CN | 101042588 A | 9/2007 |
| EP | 1369332 A2 * | 12/2003 |
| JP | 8-211937 | 8/1996 |
| JP | 10177415 A | 6/1998 |
| JP | 11-85280 | 3/1999 |
| JP | 2001-195128 | 7/2001 |
| JP | 2004-252631 | 9/2004 |

OTHER PUBLICATIONS

Ling Qiu, Wen-Jing Hsu, Shell-Ying Huang & Han Wang, Scheduling and Routing Algorithms for AGVs: A Survey, Jul. 2001, Singapore.*
Written Opinion of The International Searching Authority.
Office Action dated Nov. 22, 2012 from corresponding CN Appln No. 200980139760.8.
Krishna Moorthy Rajeeva Lochana Moorthy & Wee Hock Guan, Deadlock Prediction and Avoidance in an AGV System, Jun. 2000, Singapore—MIT Alliance.
EP Extended Search Report issued May 3, 2013, on EP Patent Application 09818904.6.

* cited by examiner

*Primary Examiner* — James Trammell
*Assistant Examiner* — James E Stroud
(74) *Attorney, Agent, or Firm* — Adli Law Group P.C.

(57) ABSTRACT

A controller (140) included in a traveling vehicle system (100) includes: a traveling-prohibited section setting unit (145) configured to set a traveling-prohibited section which is a section of a traveling path (130) which a traveling vehicle cannot travel; a determination unit (147) configured to determine, for each of stations, when a traveling-prohibited section is set by the traveling-prohibited section setting unit (145), whether or not the traveling vehicle can return, to one of the stations from which the traveling vehicle departs, without passing the traveling-prohibited section; and an availability setting unit (148) configured to set the station as available when the determination unit (147) determines that the traveling vehicle can return to the station, and to set the station as unavailable when the determination unit (147) determines that the traveling vehicle cannot return to the station.

12 Claims, 8 Drawing Sheets

TRAVELING VEHICLE SYSTEM

BACKGROUND ART

The present invention relates to a traveling vehicle system in which a traveling vehicle travels a predetermined traveling path. In particular, the present invention relates to the traveling vehicle system which manages the availability of stations set up along the traveling path.

BACKGROUND ART

A traveling vehicle system which is controlled by a computer and allows an unmanned traveling vehicle to travel a traveling path has been used. The traveling path includes a plurality of one-way closed paths which are, for example, fixed to a ceiling or disposed on a floor. When a failure or the like occurs on a traveling vehicle used in the traveling vehicle system, other traveling vehicles cannot travel a section of the traveling path which includes the spot where the disabled car stays. Also, when a rail which forms the traveling path is under construction, the traveling vehicle cannot travel a section of the traveling path under construction.

In view of this, when a certain area becomes unavailable for the traveling vehicle to travel, the conventional traveling vehicle system sets a section of the traveling path which includes the unavailable area as a traveling-prohibited section. Thereby, when selecting a path to a designated station for the traveling vehicle, the traveling vehicle system selects a path such that the traveling vehicle does not travel the traveling-prohibited section (for example, refer to Patent Literature (PTL) 1).

CITATION LIST

Patent Literature

[PTL 1]
Japanese Unexamined Patent Application Publication No. 11-85280.

SUMMARY OF INVENTION

Technical Problem

However, when a path to the designated station does not exist, all the information transmitted to an upper system from the above described conventional traveling vehicle system is that a path to reach the designated station does not exist. In other words, the traveling vehicle system and the upper system cannot provide information regarding the availability of the stations which is associated with the setting of the traveling-prohibited section.

Thus, not knowing the station which the traveling vehicle can reach, the upper system is unable to designate an alternative station for the traveling vehicle system. As a result, in the worst case, the upper system and the traveling vehicle system keep transmitting and receiving the order to reach the station which the traveling vehicle cannot reach and the information which notifies that the path to the designated station does not exist. This causes the traveling vehicle to stop on a traveling path with an article to deliver, and to be a factor for a traffic hold-up.

The present invention is conceived in view of the above described problem. The object of the present invention is to provide the traveling vehicle system which can provide precise information regarding the availability of the stations which is associated with the setting of the traveling-prohibited section.

Solution to Problem

In order to achieve the object described above, the traveling vehicle system according to the present invention includes: a traveling path which is pre-provided and includes at least two one-way closed paths connected to one another; stations set up along the traveling path; a traveling vehicle which travels the traveling path; and a management apparatus which manages availability of the stations. The management apparatus includes: a traveling-prohibited section setting unit configured to set a traveling-prohibited section which is a section of the traveling path which the traveling vehicle cannot travel; a determination unit configured to determine, for each of the stations, when a traveling-prohibited section is set by the traveling-prohibited section setting unit, whether or not the traveling vehicle can return, to one of the stations from which the traveling vehicle departs, without passing the traveling-prohibited section; and an availability setting unit configured to set the station as available when the determination unit determines that the traveling vehicle can return to the station, and to set the station as unavailable when the determination unit determines that the traveling vehicle cannot return to the station.

With this, when the traveling-prohibited section is set, the availability of all the stations can be determined. Thus, the traveling vehicle system according to the present invention can provide precise information regarding the availability of stations which is associated with the setting of the traveling-prohibited section. As a result, it is possible to avoid the confusion such as the transmission of an order which requires the traveling vehicle to reach the unavailable station.

Further, since the station to which the traveling vehicle cannot return is set as unavailable, it is possible to avoid the situation where the traveling vehicle cannot move to an other station after reaching the designated station.

Further, preferably, the traveling-prohibited section setting unit is further configured to cancel one of traveling-prohibited sections including the traveling-prohibited section, and the determination unit is further configured to determine, for each of the stations set as unavailable by the availability setting unit, whether or not the traveling vehicle can return, to the station from which the traveling vehicle departs, without passing one of traveling-prohibited sections which are yet to be canceled and are included in the traveling-prohibited sections, when one of the traveling-prohibited sections is canceled by the traveling-prohibited section setting unit.

With this, when the traveling-prohibited section is canceled, the availability of the station set as unavailable can be determined. Thus, the station set as unavailable can be restored without delay.

Further, preferably, the management apparatus further includes an obtaining unit configured to obtain layout change information which indicates a change in layout of either the traveling path or the stations, and the determination unit is further configured to determine based on a changed layout, for each of the stations, whether or not the traveling vehicle can return, to the station from which the traveling vehicle departs, without passing the traveling-prohibited section, when layout change information is obtained by the obtaining unit.

With this, even when a layout change is made, the traveling vehicle system can provide precise information regarding the availability of stations, based on the changed layout. The layout change refers to addition, removal or rearrangement of the station, or a change in the traveling path.

Advantageous Effects of Invention

The present invention enables the traveling vehicle system, in which the traveling vehicle travels the pre-provided traveling path, to provide precise information regarding the availability of stations which is associated with the setting of the traveling-prohibited section.

DESCRIPTION OF EMBODIMENT

Following describes a traveling vehicle system according to the embodiment of the present invention with reference to the drawings.

Figure 1:
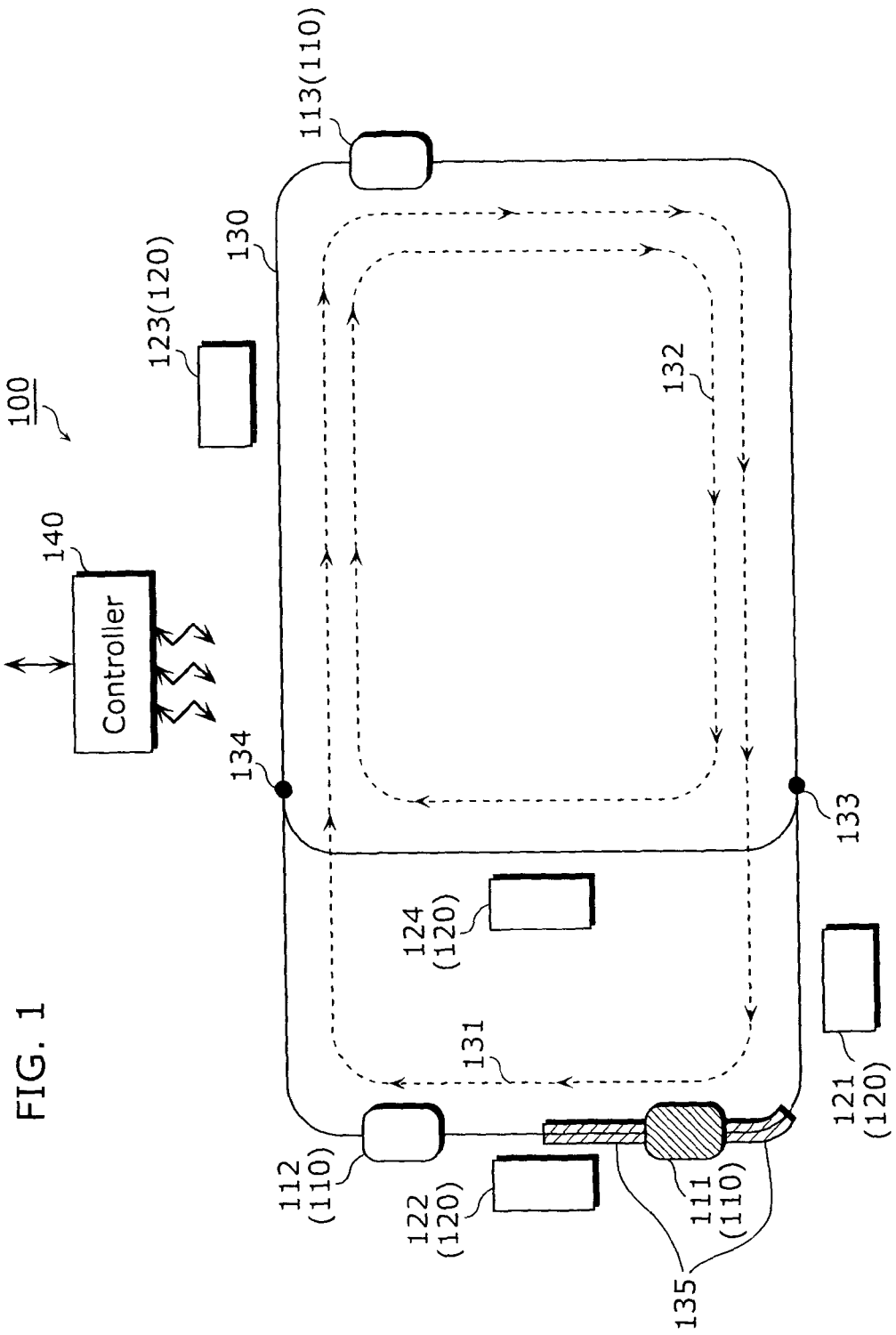
FIG. 1 is a diagram showing a structure of a traveling vehicle system according to the embodiment of the present invention.

FIG. 1 is a diagram showing a structure of a traveling vehicle system 100 according to the embodiment of the present invention.

As shown in FIG. 1, the traveling vehicle system 100 includes: traveling vehicles 111 to 113, stations 121 to 124, a traveling path 130, and a controller 140. Following describes each of components included in the traveling vehicle system 100.

The traveling vehicles 111, 112, and 113 are, for example, overhead traveling vehicles that are suspended from a guiding rail fixed to a ceiling to travel the traveling path 130 in one direction. Hereinafter, the traveling vehicles 111, 112, and 113 are referred to as a traveling vehicle 110 when each of the traveling vehicles does not need to be differentiated from one another. It is to be noted that the traveling vehicle 110 may be the traveling vehicle that travels along a rail provided on a floor.

Stations 121, 122, 123, and 124 are areas where, for example, the traveling vehicle 110 receives or delivers an article. The stations are located along the traveling path 130. Hereinafter, the stations 121, 122, 123, and 124 are referred to as a station 120 when each of the stations does not need to be differentiated from one another. It is to be noted that a stoppage point is provided on the traveling path 130 corresponding to the station 120. When the traveling vehicle 110 stops at the stoppage point, it is referred to as the traveling vehicle 110 reaches the station 120.

The traveling path 130 includes the guiding rail which is, for example, fixed to the ceiling. The traveling path 130 includes two closed paths 131 and 132. As shown in FIG. 1, the closed path 131 and the closed path 132 branch at a branch point 133, and merge at a merge point 134. Furthermore, in FIG. 1, a section of the closed path 131 is set as traveling-prohibited section 135.

A controller 140 is an example of a management apparatus which manages the availability of the station 120. Also, the controller 140 controls the traveling vehicles 110 based on an order received from an upper controller (not shown).

Figure 2:
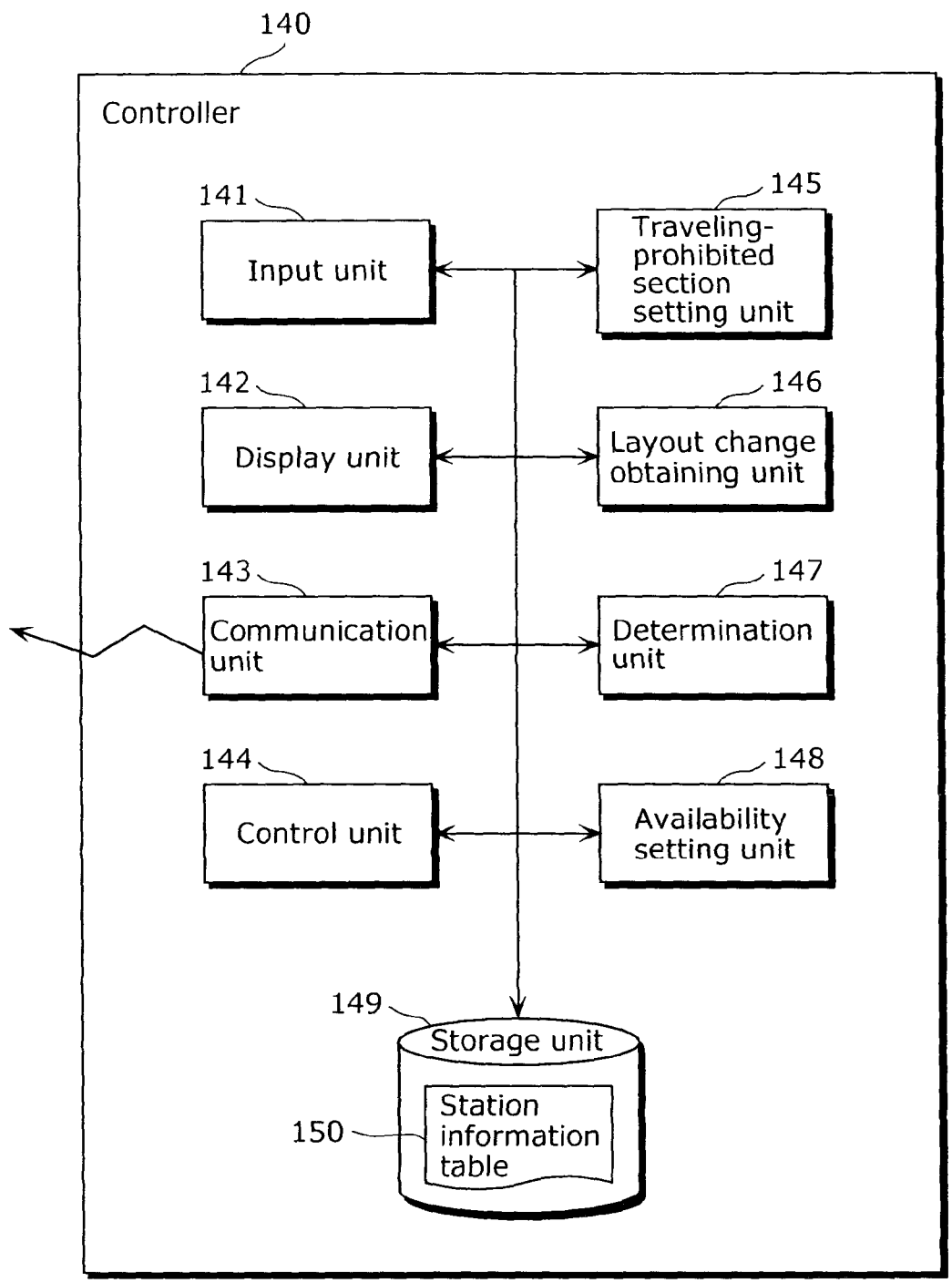
FIG. 2 is a block diagram showing a characteristic functional structure of a controller.

FIG. 2 is a block diagram showing a functional structure of the controller 140. As shown in FIG. 2, the controller 140 includes: an input unit 141, a display unit 142, a communication unit 143, a control unit 144, a traveling-prohibited section setting unit 145, a layout change obtaining unit 146, a determination unit 147, an availability setting unit 148, and a storage unit 149. Following describes each of the units included in the controller 140.

The input unit 141 includes, for example, a keyboard and a mouse. A user enters information through the input unit 141.

The display unit 142 includes, for example, a liquid crystal display. The display unit 142 shows information stored in the storage unit 149, and also shows information entered through the input unit 141.

The communication unit 143 is a processing unit which communicates with an other apparatus or the like, for example, through a wireless communication network. The communication unit 143 transmits, to the traveling vehicle 110, information regarding the station 120 to be reached, and receives information regarding current location of the traveling vehicle 110 transmitted by the traveling vehicle 110. Also, the communication unit 143 communicates with the upper controller, for example, through a Local Area Network (LAN). The communication unit 143 receives, from the upper controller, a delivery order which includes information regarding the station 120 from which the traveling vehicle 110 is to depart, and the information regarding the station 120 which the traveling vehicle 110 is to reach. Also, the communication unit 143 transmits, to the upper controller, information regarding the availability of the station 120.

The control unit 144 is a processing unit which is, for example, realized by a Central Processing Unit (CPU) and a memory. The control unit 144 controls the traveling vehicle 110 based on the delivery order transmitted by the upper controller. Specifically, the control unit 144 controls the traveling vehicle 110 such that the traveling vehicle 110 does not reach the station 120 set as unavailable by the availability setting unit 148. In other words, when an order which requires the traveling vehicle 110 to reach the station 120 set as unavailable is received from the upper controller, the control unit 144 causes the communication unit 143 to transmit, to the upper controller, information to notify the upper controller that the station 120 cannot be reached.

The traveling-prohibited section setting unit 145 is a processing unit which is, for example, realized by a memory and a CPU. The traveling-prohibited section setting unit 145 sets and cancels the traveling-prohibited section, which is a section of the traveling path 130 which the traveling vehicle 110 cannot travel.

The layout change obtaining unit 146 is a processing unit which is, for example, realized by a memory and a CPU. The layout change obtaining unit 146 obtains layout change information which indicates a change in a layout of either the traveling path 130 or the station 120. Specifically, the layout change obtaining unit 146 obtains, as the layout change information, for example, information regarding the change in arrangement of the station 120 entered by the user through the input unit 141.

The determination unit 147 is a processing unit which is, for example, realized by a memory and a CPU. When the traveling-prohibited section is set by the traveling-prohibited section setting unit 145, the determination unit 147 determines, for each of the stations 120, whether or not the traveling vehicle 110 which departs from the station 120 can return, to the station 120 from which the traveling vehicle 110 departs, without passing the traveling-prohibited section.

Also, when one of traveling-prohibited sections is canceled by the traveling-prohibited section setting unit 145, the determination unit 147 determines, for each of the stations set as unavailable by the availability setting unit 148, whether or not the traveling vehicle which departs from the station 120 can return, to the station 120 from which the traveling vehicle departs, without passing one of traveling-prohibited sections which are yet to be canceled.

Further, when the layout change information is obtained by the layout change obtaining unit 146, the determination unit 147 determines in the same manner, for each of the stations 120, whether or not the traveling vehicle 110 which departs from the station 120 can return, to the station 120 from which the traveling vehicle 110 departs, without passing the traveling-prohibited section, based on the changed layout.

For example, when the traveling vehicle 111 shown in FIG. 1 is stopped due to failure, the traveling-prohibited section setting unit 145 sets the traveling-prohibited section 135, which is a section of the closed path 131. As a result, the determination unit 147 determines that the traveling vehicles 110 which depart from the stations 121 and 122, respectively, cannot return to the stations 121 and 122, respectively, without passing the traveling-prohibited section 135. On the other hand, the determination unit 147 determines that the traveling vehicles 110 which depart from the stations 123 and 124, respectively, can return to the stations 123 and 124, respectively, without passing the traveling-prohibited section 135.

When the determination unit 147 determines that the traveling vehicle can return to the station, the availability setting unit 148 sets the station as available. On the other hand, when the determination unit 147 determines that the traveling vehicle cannot return to the station, the availability setting unit 148 sets the station as unavailable.

Here, when the station is available, it means that an order that requires the traveling vehicle to reach the station may be transmitted. On the other hand, when the station is unavailable, it means that an order that requires the traveling vehicle to reach the station may not be transmitted. Specifically, the control unit 144 controls the traveling vehicle 110 such that the traveling vehicle 110 reaches only the station 120 set as available. Also, the upper controller does not transmit, to the controller 140, the order that requires, for example, the traveling vehicle to reach the station 120 set as unavailable.

The storage unit 149 includes, for example, a read/write memory. In the storage unit 149, information regarding availability of each of the stations is stored. Specifically, the storage unit 149 stores a station information table 150.

Figure 3:
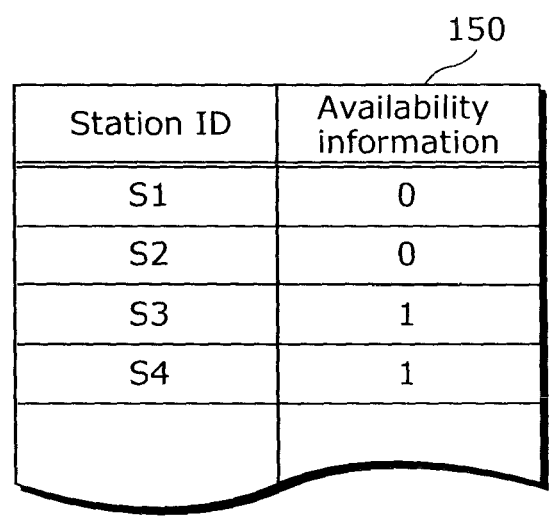
FIG. 3 is a diagram showing an example of a station information table.

FIG. 3 is a diagram showing an example of the station information table 150 stored in the storage unit 149. As shown in FIG. 3, the station information table 150 stores a station ID, and availability information.

The station ID is information which identifies the station 120. It is to be noted that the stations 121, 122, 123, and 124 shown in FIG. 1 are identified by the station IDs "S1", "S2", "S3", and "S4" respectively.

The availability information indicates whether or not the station 120 is available. When the availability information is "1", the station 120 is available. On the other hand, when the availability information is "0", the station 120 is unavailable.

For example, in the station information table 150 shown in FIG. 3, the stations 121 and 122 which are identified by the station IDs "S1" and "S2", respectively, are set as unavailable. On the other hand, in the station information table 150 shown in FIG. 3, the stations 123 and 124 which are identified by the station IDs "S3" and "S4", respectively, are set as available.

Following describes basic operations of the traveling vehicle system 100 according to this embodiment which includes the structure described above.

Figure 4:
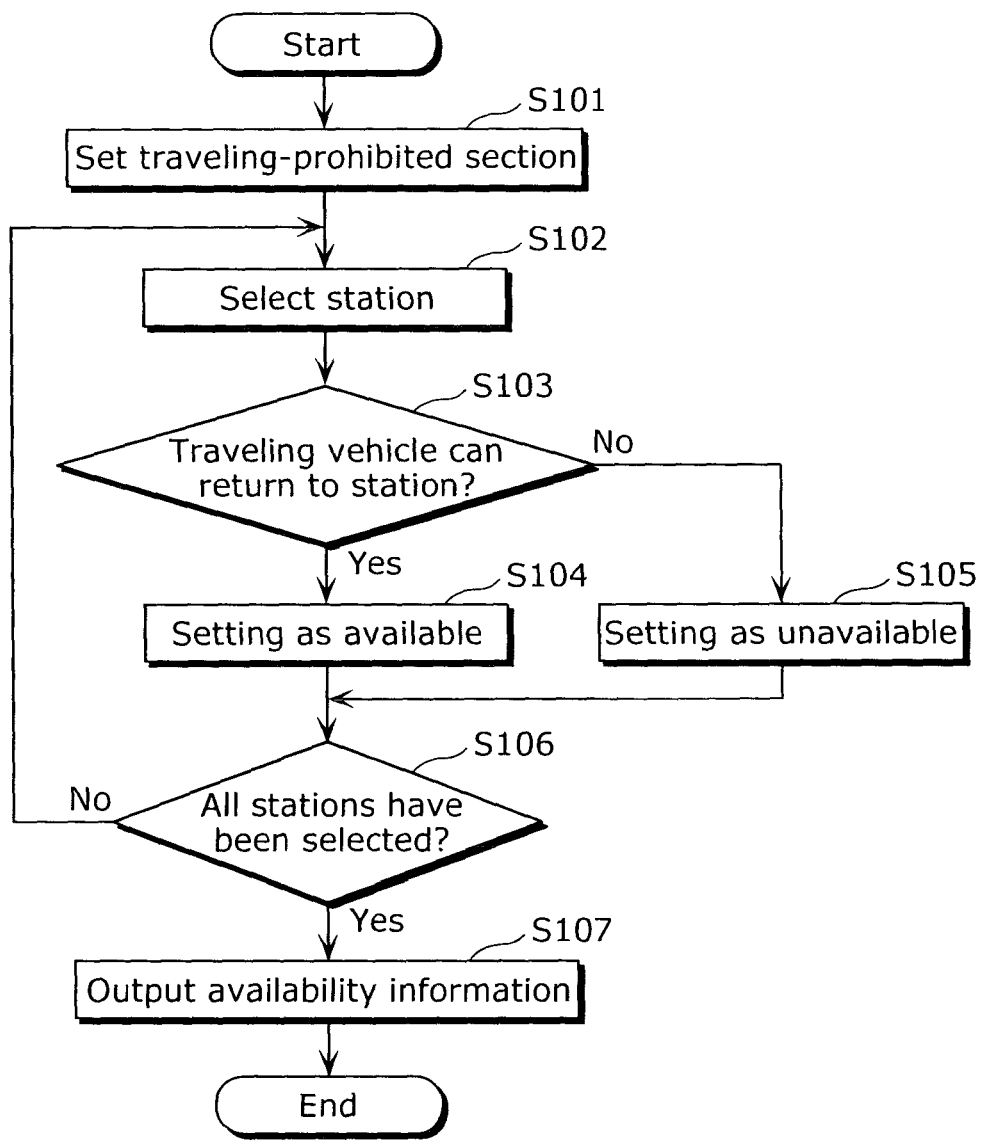
FIG. 4 is a flowchart showing steps of processing performed by the controller when a traveling-prohibited section is set.

FIG. 4 is a flowchart showing steps of processing performed by the controller 140 when the traveling-prohibited section is set.

First, the traveling-prohibited section setting unit 145 sets the traveling-prohibited section (Step S101). For example, when failure occurs on the traveling vehicle 111 shown in FIG. 1, the traveling-prohibited section setting unit 145 sets a section which includes the spot where the traveling vehicle 111 stays as the traveling-prohibited section.

Next, the determination unit 147 selects one of the stations 120 included in the traveling vehicle system 100 (Step S102). For example, the determination unit 147 selects the station 121 identified by the station ID "S1".

Next, the determination unit 147 determines whether or not the traveling vehicle 110 which departs from the station 120 selected in Step 102 can return to the station 120 without passing the traveling-prohibited section (Step S103). Here, when it is determined that the traveling vehicle can return to the station 120 (Yes in Step S103), the availability setting unit 148 sets the station 120 selected in Step S102 as available (Step S104). On the other hand, when it is determined that the traveling vehicle cannot return to the station 120 (No in Step S103), the availability setting unit 148 sets the station 120 selected in Step S102 as unavailable (Step S105).

For example, the determination unit 147 determines that the traveling vehicle 110 which departs from the station 121 cannot return to the station 121 without passing the traveling-prohibited section which includes the spot where the traveling vehicle 111 stays. Then, the availability setting unit 148 stores, in the station information table 150, the "0" as the availability information corresponding to the station ID "S1". It is to be noted that whether or not the traveling vehicle 110 can return to the station 121 is calculated using a general method for finding a traveling route.

Next, the determination unit 147 determines whether or not all the stations 120 have been selected (Step S106). Here, when there is any stations 120 which have not been selected (No in Step S106), the determination unit 147 selects one of the unselected stations 120 included in the traveling vehicle system 100 (Step S102). For example, when only the station 121 has been selected, the determination unit 147 selects the station 122. Then, the controller 140 repeats the processing of Step S103 to Step S105.

On the other hand, when all the stations 120 have been selected (Yes in Step S106), the controller 140 outputs the availability information stored in the station information table 150 (Step S107). Specifically, the communication unit 143 transmits the availability information to the upper controller, or the display unit 142 shows the availability information.

As described, the controller 140 sets the availability of the station 120 when the traveling-prohibited section is set.

Figure 5:
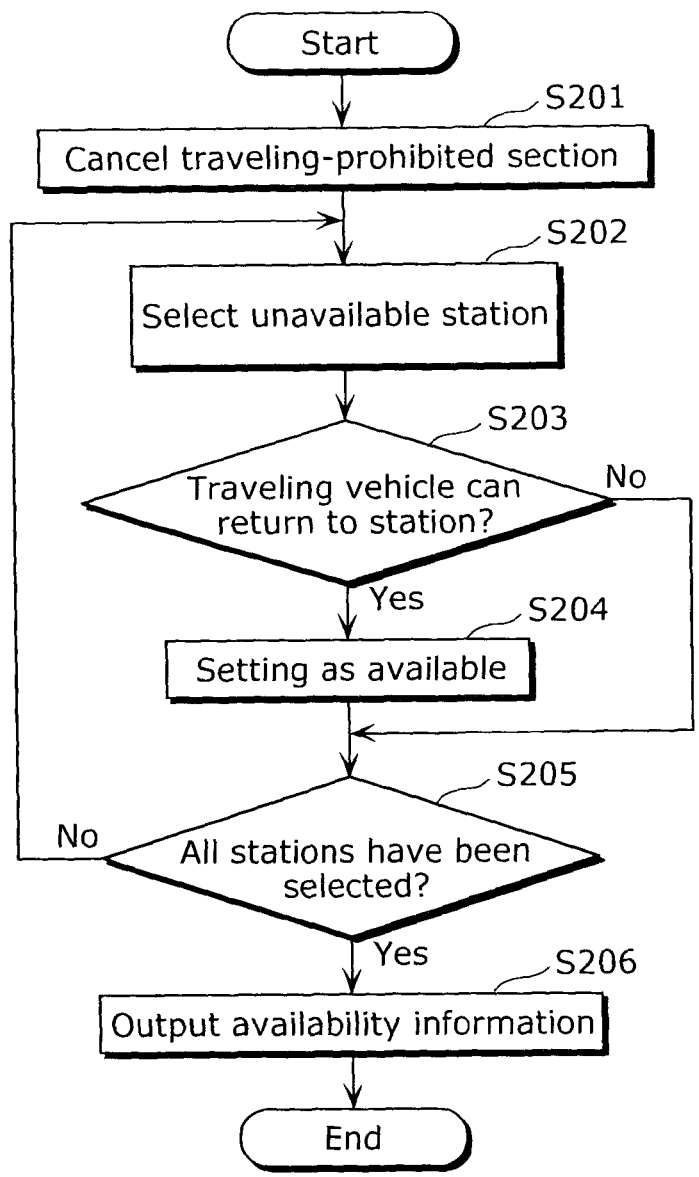
FIG. 5 is a flowchart showing steps of processing performed by the controller when the traveling-prohibited section is cancelled.

FIG. 5 is a flowchart showing steps of processing performed by the controller 140 when the traveling-prohibited section is cancelled.

First, the traveling-prohibited section setting unit 145 cancels the traveling-prohibited section (Step S201). For example, when the failure of the traveling vehicle 111 shown in FIG. 1 is repaired, the traveling-prohibited section setting unit 145 cancels the traveling-prohibited section which has been set.

Next, the determination unit 147 selects one of the stations 120 set as unavailable (Step S202). For example, the determination unit 147 refers to the station information table 150 to select one of the stations 120 which has "0" as the availability information and is identified by the station ID.

Next, the determination unit 147 determines whether or not the traveling vehicle 110 which departs from the station 120 selected in Step S202 can return, to the station 120, without passing the traveling-prohibited section which is yet to be canceled (Step S203). Here, when it is determined that the traveling vehicle 110 can return to the station 120 (Yes in Step S203), the availability setting unit 148 changes the availability of the station 120 selected in Step S102 to available (Step S204). On the other hand, when it is determined the traveling vehicle 110 cannot return to the station 120 (No in Step S203), the availability setting unit 148 skips the Step S204 and proceeds to the processing of Step S205.

Next, the determination unit 147 determines whether or not all the stations 120 set as unavailable have been selected (Step S205). Here, when there is any unselected stations 120 (No in Step S205), the determination unit 147 selects one of the unselected stations 120 set as unavailable (Step S202). On the other hand, when all the stations 120 have been selected (Yes in Step S205), the controller 140 outputs the availability information stored in the station information table 150 (Step S206).

As described, when the traveling-prohibited section is canceled, the controller 140 changes, as necessary, the availability of the station 120 set as unavailable.

Figure 6:
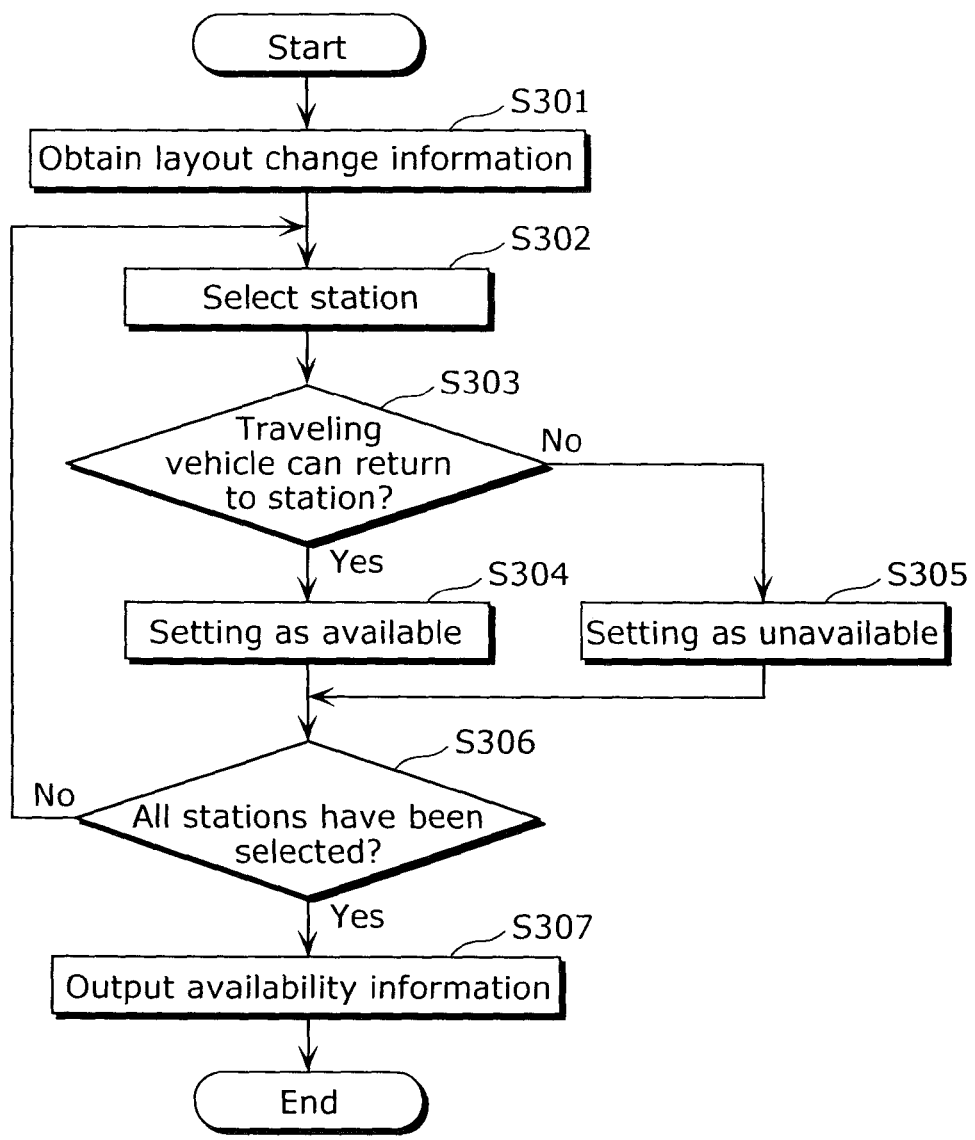
FIG. 6 is a flowchart showing steps of processing performed by the controller when layout change information is obtained.

FIG. 6 is a flowchart showing steps of processing performed by the controller 140 when layout change information is obtained.

First, the layout change obtaining unit 146 obtains the layout change information which indicates a change in the layout (Step S301). For example, when the station 120 is set up, removed, or rearranged, or when the traveling path 130 is added, removed, or changed, the layout change obtaining unit 146 obtains the layout change information.

Next, the determination unit 147 selects one of the stations 120 included in the traveling vehicle system 100 (Step S302).

Next, the determination unit 147 determines whether or not the traveling vehicle 110 which departs from the station 120 selected in Step S302 can return, to the station 120, without passing the traveling-prohibited section, based on the changed layout (Step S303). Here, when it is determined that the traveling vehicle can return to the station 120 (Yes in Step S303), the availability setting unit 148 sets the station 120 selected in Step S302 as available (Step S304). On the other hand, when it is determined that the traveling vehicle cannot return to the station 120 (No in Step S303), the availability setting unit 148 sets the station 120 selected in Step S302 as unavailable (Step S305).

Next, the determination unit 147 determines whether or not all the stations 120 have been selected (Step S306). Here, when there is any unselected stations 120 (No in Step S306), the determination unit 147 selects one of the unselected stations 120 included in the traveling vehicle system 100 (Step S302). On the other hand, when all the stations 120 have been selected (Yes in Step S306), the controller 140 outputs the availability information stored in the station information table 150 (Step S307).

As described, the controller 140 sets the availability of the station 120 when the layout is changed.

Figure 7:
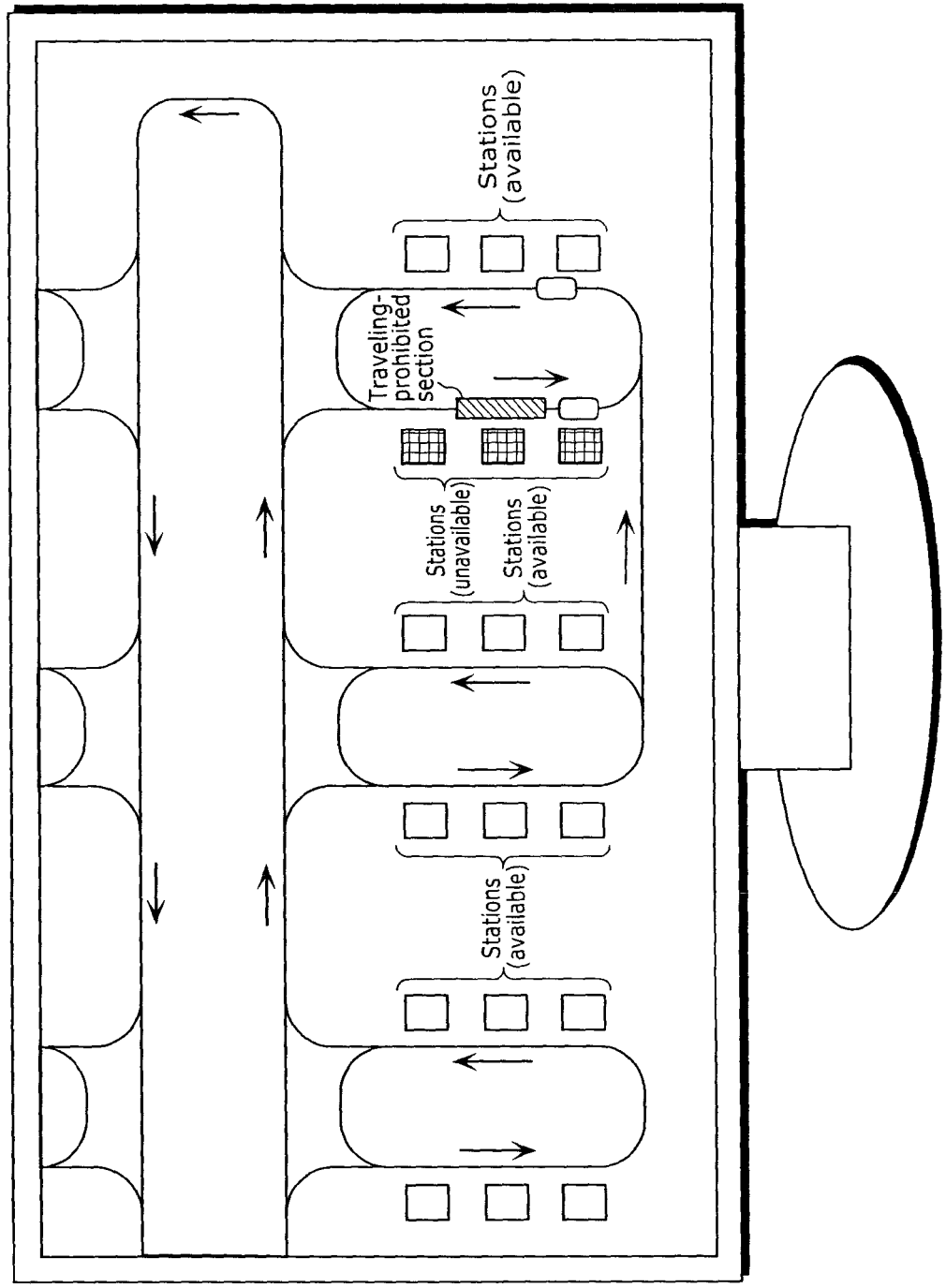
FIG. 7 is a diagram showing an example of availability information of stations shown by a display unit.

As described above, in the traveling vehicle system 100 according to this embodiment, the availability setting unit 148 can set the availability of all the stations 120 when the traveling-prohibited section is set. This enables the controller 140 to provide precise information regarding the availability of the station 120 which is associated with the setting of the traveling-prohibited section. As a result, the traveling vehicle system 100 can transmits, to the upper controller or the like, the information regarding the availability of the station 120 which is associated with the setting of the traveling-prohibited section. Thus, confusion that arises from an order which requires the traveling vehicle to reach the unavailable station 120 can be avoided. In addition, as shown in FIG. 7, the display unit 142 can display, on a monitor or the like, the information regarding the traveling-prohibited section and the availability of the station 120. Thus, the user can easily understand the state of the traveling vehicle system 100.

The availability setting unit 148 sets the station to which the traveling vehicle 110 cannot return as unavailable. This means that, in the traveling vehicle system 100, it is possible to avoid the situation where the traveling vehicle 110 cannot move to an other station 120 after reaching the designated station. Specifically, the availability setting unit 148 sets the station 121 in FIG. 1 as unavailable. This enables the traveling vehicle system 100 to prevent the transmission of an order which requires the traveling vehicle 110 to reach the station 121 from which the traveling vehicle 110 cannot move. In other words, the traveling vehicle system 100 can raise an operation rate when the traveling-prohibited section is set.

In addition, when the traveling-prohibited section is canceled, the traveling vehicle system 100 can change the availability of the station 120 set as unavailable. Accordingly, the traveling vehicle system 100 can restore, without delay, the station 120 set as unavailable.

In addition, when the layout change which indicates an addition, removal or rearrangement of the station 120, or the change in the traveling path 130 is made, the traveling vehicle system can provide precise information regarding the availability of the station 120, based on the changed layout.

In addition, the traveling vehicle system 100 does not set availability on the traveling vehicle 110. Thus, if any, the traveling vehicle 110 which exists in the traveling-prohibited section is allowed to travel to the available station 120. Specifically, the traveling vehicle 112 in FIG. 1 can fulfill an order to deliver an article from the station 123 to the station 124.

In addition, the traveling-prohibited section setting unit 145 sets only a section of the closed path, which includes the area where the traveling vehicle 110 cannot travel, as the traveling-prohibited section. In other words, unlike the conventional traveling vehicle system, the traveling-prohibited section setting unit 145 does not set the entire closed path, which includes the area where the traveling vehicle 110 cannot travel, as the traveling-prohibited section. Thus, the number of the unavailable stations and the unavailable traveling vehicles can be limited to a minimum number. A specific example is described with reference to FIG. 8.

Figure 8:
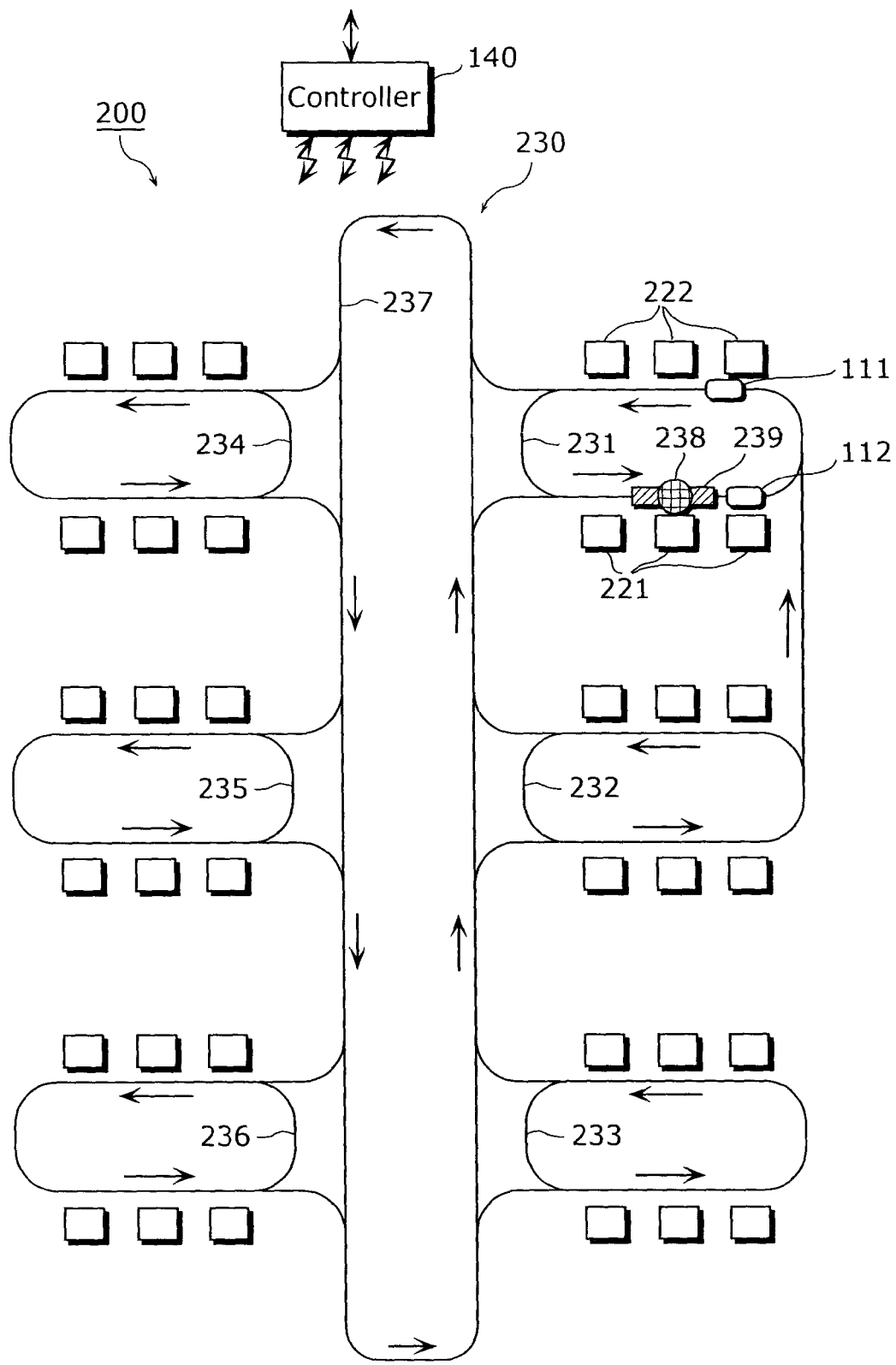
FIG. 8 is a diagram showing an other example of the traveling vehicle system.

FIG. 8 is a diagram showing an other example of the traveling vehicle system. As shown in FIG. 8, the traveling vehicle system 200 includes a traveling path 230 and stations 221 and 222. The traveling path 230 includes closed paths 231 to 237. Other components of the traveling vehicle system 200 are the same as the traveling vehicle system 100, and thus the description thereof is omitted.

The traveling-prohibited section setting unit 145 in the traveling vehicle system 200 sets a traveling-prohibited section 239 when an area 238 on the traveling path 230 becomes unavailable for the traveling vehicle to travel. As a result, the traveling vehicle which departs from the station 221 cannot return to the station 221 without passing the traveling-prohibited section 239. Thus, the availability setting unit 148 sets the station 221 as unavailable. On the other hand, the traveling vehicle which departs from the station 222 can return to the station 222 without passing the traveling-prohibited section 239. Thus, the availability setting unit 148 sets the station 222 as available.

As described, unlike the conventional traveling vehicle system which sets the station 222 as unavailable because all the sections of the closed path 231 are set as unavailable, the traveling vehicle system 200 according to the present invention can set the station 222 as available. In other words, with the traveling vehicle system 200 according to the present invention, the number of the unavailable stations can be limited to a minimum number.

In addition, when the area 238 becomes unavailable for the traveling vehicle 110 to travel, the traveling-prohibited section setting unit 145 sets minimum number of sections as the traveling-prohibited section 239. In the conventional system, the traveling vehicles 111 and 112 are out of operation because all sections of the closed path 231 or sections between branches in the traveling path 230, in which the area 238 is included, are set as the traveling-prohibited sections. Unlike this, the traveling vehicles 111 and 112 in the traveling vehicle system 200 can continue traveling. In other words, with the traveling vehicle system 200 according to the present invention, the number of the unavailable traveling vehicles can be limited to a minimum number.

While the traveling vehicle system according to the present invention has been described with reference to the embodiment, it is to be understood that the present invention is not limited to the embodiment described above. Within the spirit of this invention, all modifications that can be made by those skilled in the art are intended to be included within the scope of this invention.

For example, although the traveling vehicle system described in the above embodiment included one controller, the traveling vehicle system may include a plurality of controllers. When controllers are used, each of the controllers is in charge of certain sections of the traveling path, and manages the availability of the stations included in the responsible sections of the traveling path. The traveling vehicle system which includes controllers can swiftly determine the availability of the station even in the case of a complicated traveling vehicle system which includes a plurality of closed paths and stations.

In the embodiment described above, the controller controls the traveling vehicle according to the order transmitted by the upper controller. Alternatively, the controller may designate the station to be reached by the traveling vehicle, based on the availability information of the station.

It is to be noted that the present invention can also be realized as a station management method having, as steps, characteristic processing units included in the management apparatus (controller) of the above described traveling vehicle system. Also, the present invention can also be realized as a program causing a computer to execute the characteristic steps. In addition, such a program can be distributed through recording media such as a Compact Disc-Read Only Memory (CD-ROM) or a communication network such as the Internet.

INDUSTRIAL APPLICABILITY

The traveling vehicle system according to the present invention can provide precise information regarding the availability of the stations which is associated with the setting of the traveling-prohibited section. For example, the present invention can be applied to the overhead conveying vehicle system in which an unmanned traveling vehicle travels along the guiding rail fixed to a ceiling to deliver an article.

REFERENCE SIGNS LIST 100, 200 Traveling vehicle system
110, 111, 112, 113 Traveling vehicle
120, 121, 122, 123, 124, 221, 222 Station
130, 230 Traveling path
131, 132, 231, 232, 233, 234, 235, 236, 237 Closed path
133 Branch point
134 Merge point
135, 239 Traveling-prohibited section
140 Controller
141 Input unit
142 Display unit
143 Communication unit
144 Control unit
145 Traveling-prohibited section setting unit
146 Layout change obtaining unit
147 Determination unit
148 Availability setting unit
149 Storage unit
150 Station information table

The invention claimed is:

1. A traveling vehicle system comprising:
a traveling path which is pre-provided and includes at least two one-way closed paths connected to one another;
stations set up along said traveling path;
a traveling vehicle which travels said traveling path; and
a management apparatus which manages availability of said stations, wherein said management apparatus includes:
a traveling-prohibited section setting unit configured to set a traveling-prohibited section which is a section of said traveling path which said traveling vehicle cannot travel;
a determination unit configured to determine, for each of said stations, when a traveling-prohibited section is set by said traveling-prohibited section setting unit, whether or not said traveling vehicle can return, to one of said stations from which said traveling vehicle departs, without passing the traveling-prohibited section; and
an availability setting unit configured to set said station as available when said determination unit determines that said traveling vehicle can return to said station, and to set said station as unavailable when said determination unit determines that said traveling vehicle cannot return to said station.

2. The traveling vehicle system according to claim 1,
wherein said traveling-prohibited section setting unit is further configured to cancel one of traveling-prohibited sections including the traveling-prohibited section, and
said determination unit is further configured to determine, for each of said stations set as unavailable by said availability setting unit, whether or not said traveling vehicle can return, to said station from which the traveling vehicle departs, without passing one of traveling-prohibited sections which are yet to be canceled and are included in the traveling-prohibited sections, when one of the traveling-prohibited sections is canceled by said traveling-prohibited section setting unit.

3. The traveling vehicle system according to claim 1,
wherein said management apparatus further includes an obtaining unit configured to obtain layout change information which indicates a change in layout of either said traveling path or said stations, and said determination unit is further configured to determine based on a changed layout, for each of said stations, whether or not said traveling vehicle can return, to said station from which said traveling vehicle departs, without passing the traveling-prohibited section, when layout change information is obtained by said obtaining unit.

4. The traveling vehicle system according to claim 1, wherein the travelling vehicle is suspended from a guiding rail fixed to a ceiling.

5. The traveling vehicle system according to claim 2, wherein the travelling vehicle is suspended from a guiding rail fixed to a ceiling.

6. The traveling vehicle system according to claim 3, wherein the travelling vehicle is suspended from a guiding rail fixed to a ceiling.

7. The traveling vehicle system according to claim 1, wherein the travelling vehicle receives or delivers an article to the station.

8. The traveling vehicle system according to claim 2, wherein the travelling vehicle receives or delivers an article to the station.

9. The traveling vehicle system according to claim 3, wherein the travelling vehicle receives or delivers an article to the station.

10. The traveling vehicle system according to claim 4, wherein the travelling vehicle receives or delivers an article to the station.

11. The traveling vehicle system according to claim 5, wherein the travelling vehicle receives or delivers an article to the station.

12. The traveling vehicle system according to claim 6, wherein the travelling vehicle receives or delivers an article to the station.

* * * * *